United States Patent [19]
Correia et al.

[11] Patent Number: 5,358,374
[45] Date of Patent: Oct. 25, 1994

[54] TURBINE NOZZLE BACKFLOW INHIBITOR

[75] Inventors: Victor H. S. Correia, Scotia, N.Y.; Richard W. Albrecht, Fairfield; Robert A. Frederick, West Chester, both of Ohio

[73] Assignee: General Electric Company, Cincinnati, Ohio

[21] Appl. No.: 94,804

[22] Filed: Jul. 21, 1993

[51] Int. Cl.$^5$ .................... F01D 9/06; F01D 11/00
[52] U.S. Cl. ................................. 415/47; 415/115; 415/116
[58] Field of Search .............. 415/115, 116, 47, 173.7, 415/208.2

[56] References Cited

U.S. PATENT DOCUMENTS

| | | | |
|---|---|---|---|
| 2,470,471 | 5/1949 | Carleton | 277/3 |
| 3,975,901 | 8/1976 | Hallinger et al. | 415/117 |
| 4,728,260 | 3/1988 | Ishii | 415/152 |
| 4,805,398 | 2/1989 | Jourdain et al. | 415/47 |
| 5,022,817 | 6/1991 | O'Halloran | 415/115 |
| 5,064,343 | 11/1991 | Mills | 415/115 |
| 5,082,245 | 1/1992 | Kast | 251/149.6 |

Primary Examiner—Edward K. Look
Assistant Examiner—Michael S. Lee
Attorney, Agent, or Firm—Jerome C. Squillaro; Nathan D. Herkamp

[57] ABSTRACT

A turbine nozzle includes a vane integrally joined between outer and inner bands, with the inner band having a purge hole for discharging a portion of cooling air channeled through the vane. A checkvalve is provided in the purge hole for preventing backflow therethrough into the vane. In an exemplary embodiment, the checkvalve allows a reduction in cooling air through the vane at low power operation for increasing efficiency while preventing backflow of combustion gases into the purge hole.

9 Claims, 3 Drawing Sheets

TURBINE NOZZLE BACKFLOW INHIBITOR

The present invention relates generally to gas turbine engines, and, more specifically, to turbine nozzle cooling.

BACKGROUND OF THE INVENTION

A typical gas turbine engine includes in serial flow communication a compressor, combustor, high pressure turbine (HPT), and a power turbine or low pressure turbine (LPT). The HPT includes one or more rotor blade stages with each having a stationary turbine nozzle disposed upstream therefrom for channeling thereto combustion gas from the combustor. The HPT nozzle firstly receives the hot combustion gas from the combustor and channels it to the first stage rotor blades which extract energy therefrom. The pressure and temperature of the combustion gas are decreased when the gas exits the first stage blades and enters the second stage turbine nozzle from which it flows to the second stage blades which extract further energy therefrom.

Since the turbine nozzles channel the hot combustion gas, they are cooled using a portion of air bled from the compressor to prevent thermal distress thereof and for effecting a useful life during operation. They require maximum cooling during high power operation of the engine such as during takeoff for an aircraft gas turbine engine, and reduced cooling at low power operation such as during cruise. The air bled from the compressor which is used for nozzle cooling is therefore not used in the combustion process and correspondingly decreases the overall efficiency of the engine.

Accordingly, it is desired to use as little bleed air as possible for effectively cooling the nozzles for maximizing the operating efficiency of the engine. For example, it is conventionally known to modulate the bleed airflow to the second stage turbine nozzle for providing maximum airflow at high power operation and minimum airflow at low power operation. This may be accomplished by providing a conventional modulating valve in the bleed line between the compressor and the second stage nozzle. However, the minimum bleed air flowrate must nevertheless be suitably high and have a suitable pressure to prevent backflow of combustion gases from the main flowpath into the nozzle vane.

More specifically, the second stage nozzle includes a plurality of circumferentially spaced apart vanes typically formed in arcuate segments each having two vanes extending between outer and inner bands. The vanes are hollow and typically include an impingement air baffle therein for enhancing cooling of the vanes, with the bleed air being introduced through the radially outer band for flow radially inwardly through the vanes for discharge in part through the radially inner bands. A conventional thermal shield is typically disposed radially inwardly of the inner bands and extends axially between the first and second stage rotors. A conventional honeycomb seal is joined to the inner band and cooperates with a plurality of radially outwardly extending labyrinth seal teeth extending outwardly from the thermal shield. This arrangement defines a forward cavity or chamber between the first stage rotor and the second stage nozzle, and an aft cavity or chamber disposed between the second stage nozzle and the second stage rotor. The inner band includes forward and aft purge holes through which a portion of the bleed air is discharged into the respective forward and aft chambers from the vane. The purge air has a suitable pressure and flowrate for flowing from the respective forward and aft chambers radially outwardly into the main combustion flowpath to continually purge the chambers and prevent backflow of the combustion gases into these chambers.

Accordingly, the bleed air to the vanes must be suitably modulated to provide a minimum flowrate and pressure to effectively continually purge the forward and aft chambers and prevent backflow into these chambers or into the vanes themselves. However, this minimum flowrate typically required for obtaining suitable purge flow is also typically more than is required for effectively cooling the nozzle vanes during low power operation such as cruise. Overall efficiency of the engine is, therefore, being reduced to ensure effective purge flow without backflow.

SUMMARY OF THE INVENTION

A turbine nozzle includes a vane integrally joined between outer and inner bands, with the inner band having a purge hole for discharging a portion of cooling air channeled through the vane. A checkvalve is provided in the purge hole for preventing backflow therethrough into the vane. In an exemplary embodiment, the checkvalve allows a reduction in cooling air through the vane at low power operation for increasing efficiency while preventing backflow of combustion gases into the purge hole.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
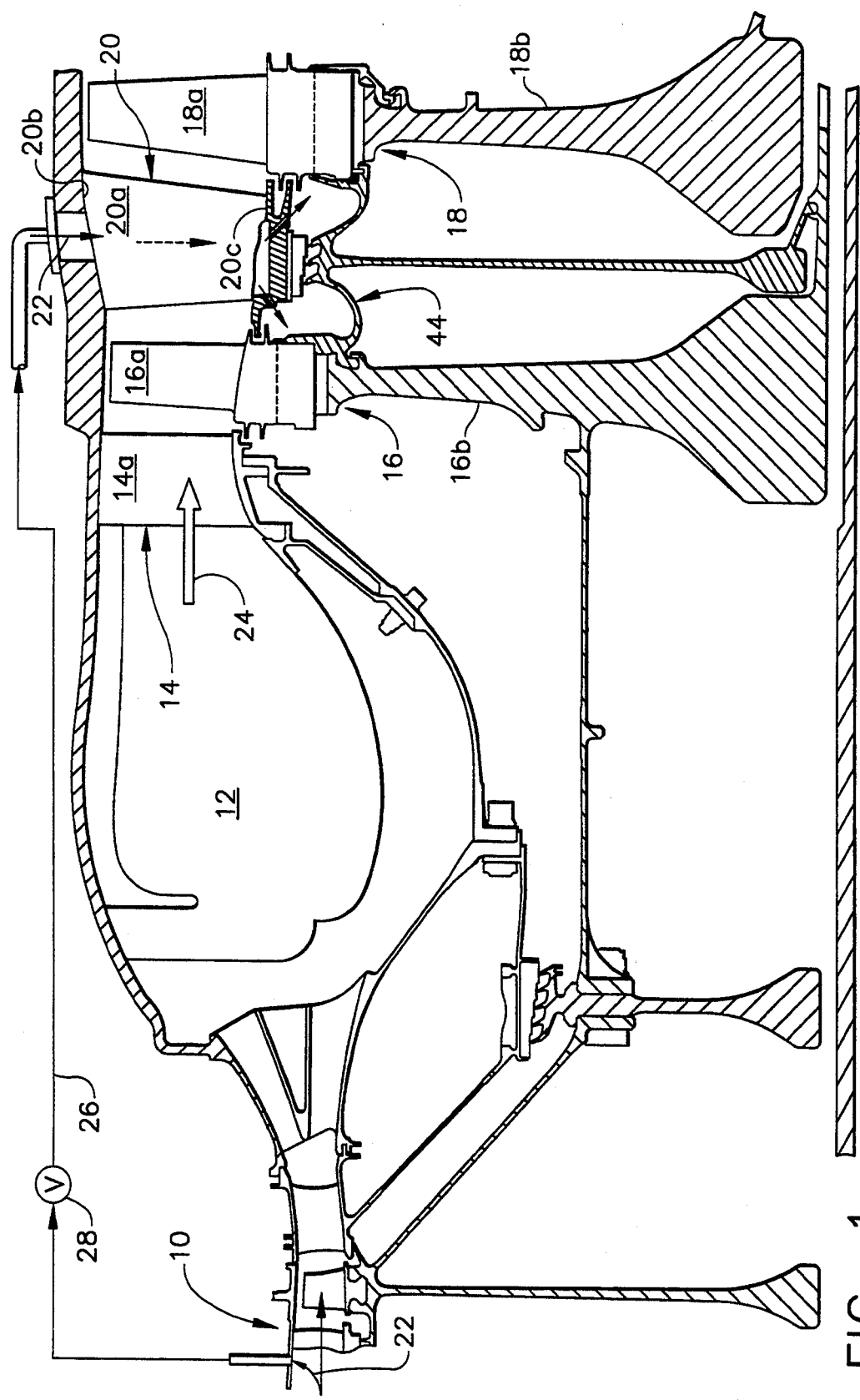
FIG. 1 is a schematic, longitudinal, partly sectional view of a portion of an aircraft gas turbine engine including a compressor, combustor, and two-stage high pressure turbine including a turbine nozzle in accordance with one embodiment of the present invention.

Illustrated schematically in FIG. 1 is a portion of an exemplary aircraft gas turbine engine including a conventional high pressure compressor (HPC) 10 followed in serial flow communication by a conventional annular combustor 12, first stage high pressure turbine nozzle 14, a conventional two-stage high pressure turbine (HPT) including a first stage turbine rotor 16 followed axially in turn by a second stage turbine rotor 18, with a stationary second stage turbine nozzle 20 disposed therebetween. A conventional power turbine or low pressure turbine (LPT) is disposed downstream from the second stage rotor 18 and is not shown in FIG. 1. The first and second stage turbine rotors 16, 18 are conventionally joined to the HPC 10 for providing power thereto.

The first stage nozzle 14 conventionally includes a plurality of circumferentially spaced apart hollow nozzle vanes 14a which are suitably provided with cooling air. The first and second turbine rotors 16, 18 conventionally include respective pluralities of circumferentially spaced apart hollow turbine blades 16a, 18a which extend radially outwardly from conventional rotor disks 16b, 18b, respectively. The blades 16a, 18a are also conventionally cooled. And, the second stage nozzle 20 includes a plurality of circumferentially spaced apart conventional hollow vanes 20a integrally joined between radially outer and inner bands 20b and 20c, respectively. The nozzle 20 is conventionally formed in arcuate segments or groups of the vanes 20a, which for example may include vanes 20a per segment, with adjacent ones of the segmented arcuate outer and inner bands 20b, 20c being suitably joined together to form a complete ring as is conventionally known.

During operation, the HPC 10 is effective for providing compressed air 22 to the combustor 12 wherein it is conventionally mixed with fuel and ignited for generating hot combustion gas 24. The combustion gas 24 flows downwardly through the nozzles 14, 20 and the blades 16a, 18a of the first and second turbine rotors 16, 18 which extract energy therefrom.

In order to cool the second stage nozzle 20 in accordance with the present invention, a conventional bleed conduit or line 26 is disposed in flow communication between the HPC 10 and the vanes 20a for channeling a portion of the compressed air 22 as bleed air to the vanes 20a for flow therethrough. A conventional modulating valve 28 is suitably disposed in the bleed line 26 for suitably modulating bleed airflow to the vanes 20a. The modulating valve 28 is conventionally positionable during operation of the engine for providing maximum bleed air to the vanes 20a during high power operation of the engine such as during a takeoff mode, and for providing minimum bleed air to the vanes 20a during low power operation such as during cruise when the cooling requirement of the vanes 20a is reduced.

Figure 2:
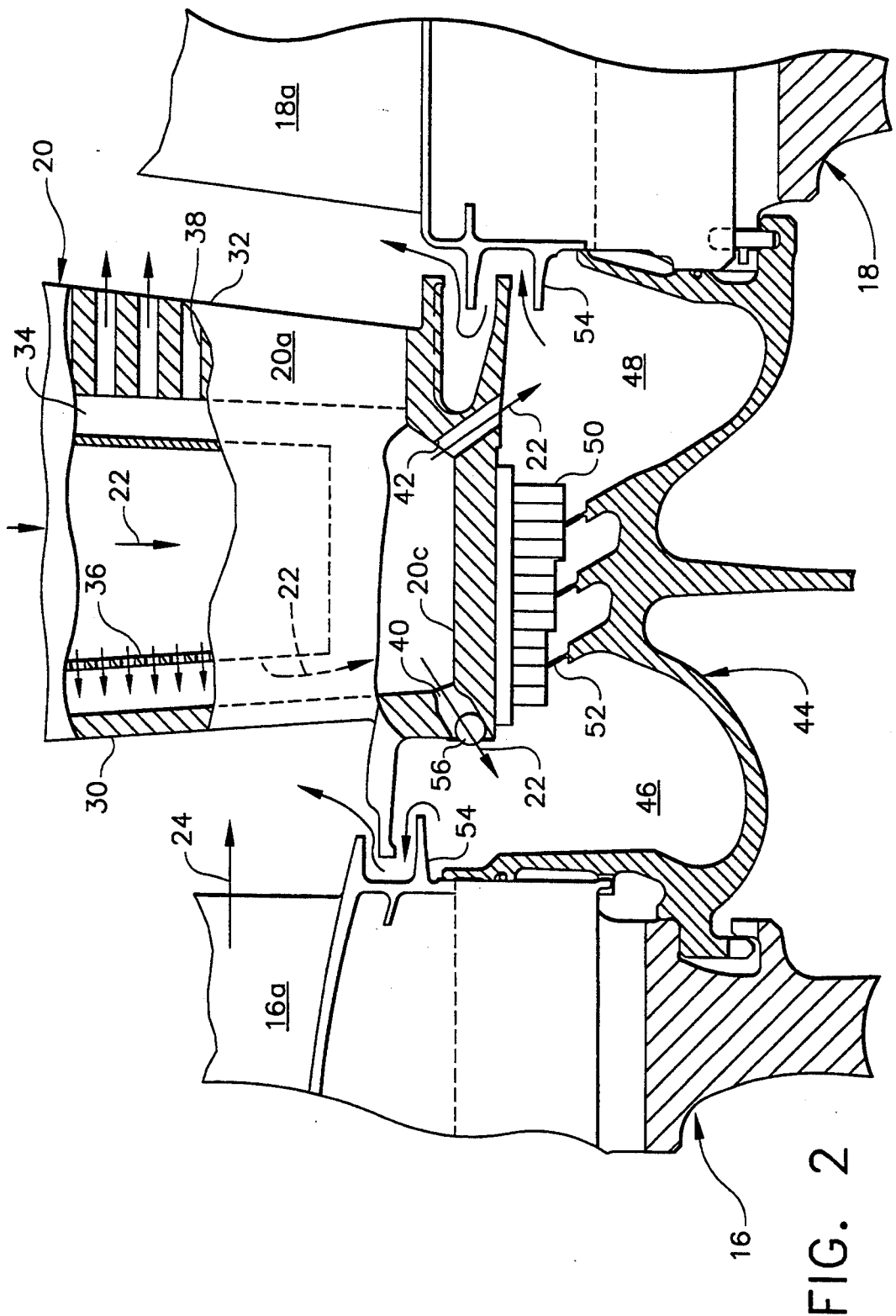
FIG. 2 is an enlarged, partly sectional view of the radially inner portion of the second stage turbine nozzle illustrated in FIG. 1 adjacent to the first and second turbine rotor stages.

FIG. 2 illustrates in more particularity the region of the engine between the first and second rotors 16, 18 adjacent to the second stage nozzle 20. Each of the nozzle vanes 20a is in the conventional form of an airfoil having a leading edge 30 over which the combustion gas 24 is first received from the first stage blades 16a, and a trailing edge 32 over which the combustion gas 24 is discharged from the nozzle 20 for flow between the second stage blades 18a. Each vane 20a is hollow and includes a central plenum 34 in which is positioned a conventional perforated impingement air baffle 36 which first receives the bleed air 22 which is then impinged against at least the inside surface of the leading edge 30 for providing cooling thereof in a conventional manner. The spent impingement air is then discharged from the vane 20a through a plurality of conventional trailing edge apertures 38 and through forward and aft purge holes 40, 42, respectively. Both purge holes 40, 42 extend through the inner band 20c in a conventional manner, with the forward purge hole 40 being disposed through the inner band 20c adjacent to the leading edge 30, and the aft purge hole 42 being disposed through the inner band 20c adjacent to the trailing edge 32.

As shown in FIG. 2, a conventional annular thermal shield 44 extends axially between the first stage rotor 16 and the vanes 20a to define an annular forward cavity or chamber 46 therebetween. The thermal shield 44 also extends axially between the vanes 20a and the second turbine rotor 18 to define an aft cavity or chamber 48 therebetween. A conventional honeycomb seal member 50 is conventionally joined to the radially inner surface of the inner bands 20c and cooperates with a plurality of conventional labyrinth seal teeth 52 extending radially outwardly from the center portion of the thermal shield 44 for providing a conventional rotating seal. Extending axially from the first and second stage turbine blades 16a, 18a adjacent the roots thereof are conventional angel wings 54 which cooperate with similar projections from the inner bands 20c to effect conventional seals therewith. In this way, the forward and aft chambers 46, 48 provide separate sealed cavities as is conventionally known for preventing leakage of the hot combustion gas 24 therein for preventing thermal distress of inner components of the engine 10. The forward and aft purge holes 40, 42 are effective for discharging portions of the spent cooling air from the vanes 20a into the respective forward and aft chambers 46, 48 to purge these chambers as is conventionally known with the purge air then flowing radially outwardly over the angel wings 54 to enter the main combustion gas flowpath.

In a conventional engine, both purge holes 40, 42 would be unobstructed for continuously providing the spent impingement air 22 as purge air into the forward and aft chambers 46, 48. This requires that the pressure of the spent impingement air within the vane plenum 34 is always maintained higher than the pressure within the forward and aft chambers 46, 48. This is conventionally effected by suitably positioning the modulating valve 28 (see FIG. 1) to provide a suitable flowrate and pressure of the bleed air 22 to the vanes 20a.

However, the amount of bleed air provided for effectively cooling the vanes 20a during low power operation such as during cruise, is still greater than that needed for cooling alone since positive forward flow of the purge air from the forward and aft purge holes 40, 42 is required to prevent backflow therethrough. If the combustion gas 24 is allowed to leave the main flowpath and enter either of the forward or aft chambers 46, 48 and backflow through the purge holes 40, 42 into the vanes 20a, thermal distress of the vanes 20a as well as in the vicinity of the thermal shield 44 would result. Accordingly, the spent impingement air 22 in the vanes 20a is conventionally maintained at a suitable pressure greater than that in the chambers 46, 48 to ensure continuous purge air flow and correspondingly provides greater cooling than that required at low power operation of the engine.

In accordance with the present invention, the modulating valve 28 is positionable at the low power condition such as during cruise operation, to additionally reduce bleed airflow to the vanes 20a and to decrease the pressure of the cooling air 22 inside the vanes 20a adjacent to the forward purge hole 40 to a value less than the pressure in the forward chamber 46 which decreases the amount of cooling air required over a conventional design for increasing overall efficiency of the engine. However, undesirable backflow of the combustion gas 24 through the forward chamber 46 and through the forward purge hole 40 into the vane 20a would occur but for the means in the form of a check-valve 56 for preventing backflow through the forward purge hole 40 into the vane 20a during such low power operation.

Figure 3:
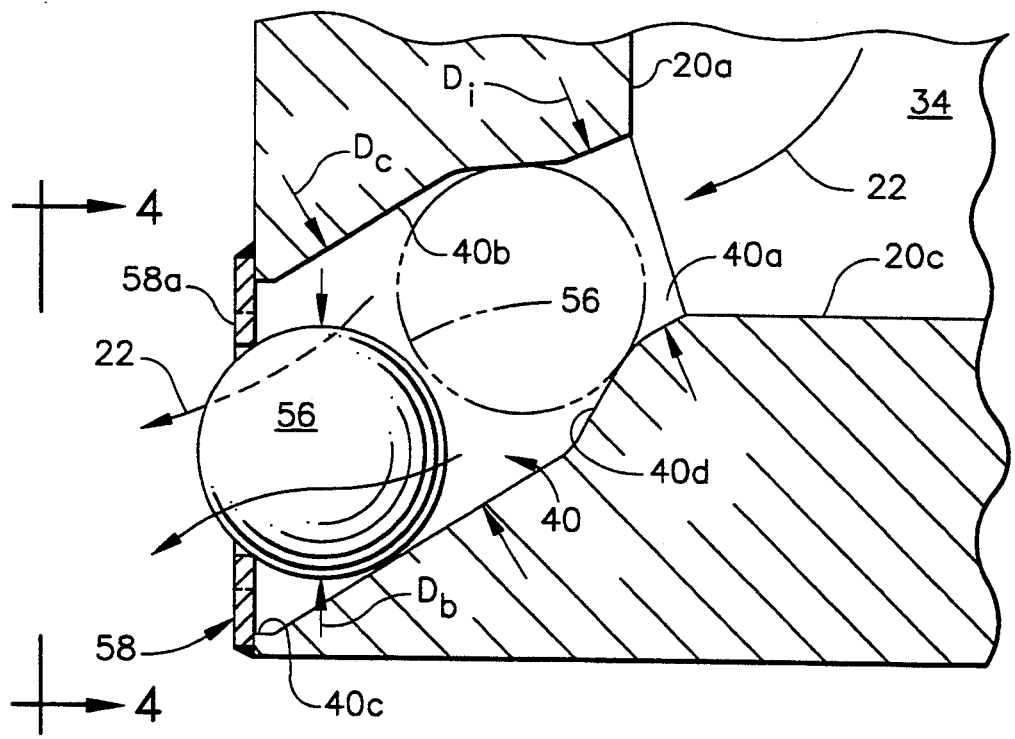
FIG. 3 is an enlarged, partly sectional view of a portion of the radially inner end of the second stage nozzle illustrated in FIG. 2 showing in more particularity an exemplary embodiment of a checkvalve for preventing backflow into the nozzle vane.

The checkvalve 56 for preventing backflow is illustrated in FIGS. 2 and 3 in the exemplary form of a spherical ball disposed in the forward purge hole 40 for permitting forward flow of the cooling air 22 to be discharged from the vane 20a into the forward chamber 46 and for preventing backflow from the forward chamber 46 through the forward purge hole 40 into the vane 20a. As shown in more particularity in FIG. 3, the forward purge hole 40 includes an inlet 40a disposed in flow communication with the bottom of the central plenum 34 of the vane 20a, and an enlarged intermediate channel 40b disposed in flow communication with the inlet 40a, and followed in turn by an outlet 40c disposed in flow communication with the intermediate channel 40b and the forward chamber 46. The ball checkvalve 56 is disposed in the intermediate channel 40b and has a diameter $D_b$ which is smaller than the diameter $D_c$ of the intermediate channel 40b and larger than the diameter $D_i$ of the inlet 40a so that it is movable in the intermediate channel 40b against the backside of the inlet 40a for blocking backflow therethrough while permitting forward flow therethrough.

Figure 4:
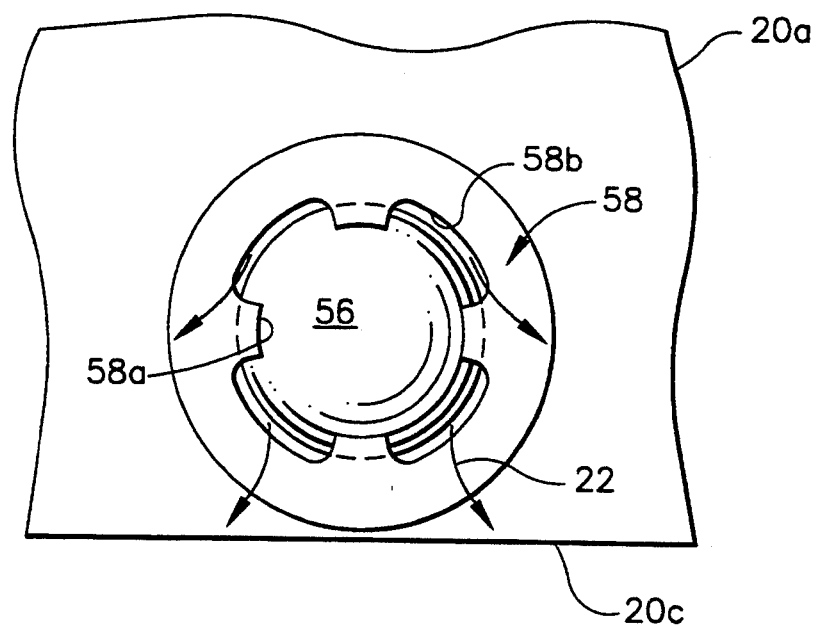
FIG. 4 is an aft facing view of the checkvalve illustrated in FIG. 3 and taken along line 4—4.

In order to prevent escape of the ball 56 from the purge hole 40, a retainer 58 in the exemplary form of an annular washer is suitably fixedly joined along the perimeter thereof, by welding for example, to the inner band 20c around the purge hole outlet 40c for retaining the ball 56 inside the intermediate channel 40b. The washer 58 is configured for allowing forward flow of the cooling air to be discharged from the purge hole outlet 40c around the ball 56 and into the forward chamber 46. In the exemplary embodiment illustrated in FIGS. 3 and 4, the washer 58 includes a plurality of radially inwardly projecting and circumferentially spaced apart tabs 58a defining circumferentially extending scallops or slots 58b therebetween. The tabs 58a are sized to prevent removal of the ball 56 from the purge hole 40, with the slots 58b allowing forward flow of the cooling air therethrough when the ball 56 is in abutting contact with the tabs 58a as illustrated in solid line in FIG. 3. The inner diameter defined by the inner ends of the several tabs 58a is suitably less than the diameter $D_b$ of the ball 56 to prevent its escape. The slots 58b necessarily have a larger diameter than that of the inner ends of the tabs 58a to allow airflow therethrough even when the ball 56 is in contact with the tabs 58a.

For relatively high power operation of the engine 10, the pressure of the cooling air 22 in the vane plenum 34 adjacent the purge hole inlet 40a is greater than the pressure in the forward chamber 46 as well as greater than the pressure of the combustion gas 24 in the main flowpath adjacent the forward chamber 46. Accordingly, the ball 56 will be forced against the retainer washer 58 as shown in solid line in FIG. 3 for allowing forward flow of the spent impingement air 22 to be discharged from the vane 20a into the forward chamber 46 for providing purge flow therein.

However, during low power operation of the engine, the flowrate and pressure of the cooling air 22 in the vane plenum 34 are substantially reduced to the point where the pressure inside the vane plenum 34 adjacent the purge hole inlet 40a is less than the pressure in the forward chamber 46 which will cause the ball 56 to move backwardly against the backside of the inlet 40a to block backflow therethrough. In the preferred embodiment illustrated in FIG. 3, the forward purge hole 40 further includes a frustoconical seat 40d integrally joining the intermediate channel 40b to the inlet 40a for sealingly receiving the ball 56 to prevent backflow from the purge hole outlet 40c into the purge hole inlet 40a. The ball 56 is illustrated in phantom line in FIG. 3 in abutting contact against the seat 40d to prevent backflow through the purge hole 40 and into the vane 20a.

The ball 56 is preferably relatively light and may be solid or hollow and made out of metal such as titanium for example so that it is allowed to move relatively freely within the forward purge hole 40 in response to the changing differential pressure acting across the purge hole 40. The ball 56 may be any other suitable metal or other materials including ceramic for use in the environment of the turbine nozzle. Since the ball 56 is free to move within the purge hole 40, vibration or rattling of the ball 56 in the purge hole 40 is reduced or eliminated by providing the conical seat 40d for fully seating the ball 56 to prevent backflow, with a positive backflow differential pressure maintaining the ball 56 in position in the seat 40d. And, with a positive forward flow differential pressure acting across the ball 56, it is held in position against the tabs 58a to prevent its movement. Preferably three or more tabs 58a are used, with four tabs 58a being illustrated in FIGS. 3 and 4, to uniformly support the ball 56 and prevent lateral movement thereof when held in position by the forward differential pressure acting across the ball 56.

In the exemplary embodiment illustrated in FIG. 2, one forward purge hole 40 and respective ball checkvalve 56 is provided for each of the vanes 20a. Since the pressure of the combustion gas 24 downstream of the vane 20a is substantially lower than it is upstream of the vane 20a, the checkvalves 56 are not required for the aft purge hole 42 since a positive forward flow differential pressure remains between the vane plenum 34 and the aft chamber 48 even during low power operation of the engine when the pressure in the plenum 34 is less than the pressure in the forward chamber 46. Accordingly, purge airflow continues through the aft chamber 48 and past the angel wings 54 into the main flowpath between the vanes 20a and the second stage blades 18a.

Although the checkvalve 56 is shown in a relatively simple form as being a ball, in alternate embodiments of the invention, the checkvalve 56 may take other suitable forms such as a conventional flapper valve, or a butterfly valve. Instead of or in addition to the use of the scalloped retainer washer 58, holes may be drilled through the inner band 20c from the forward chamber 46 and into the purge hole intermediate channel 40b for providing a suitable discharge path for the purge air flowing through the forward purge hole 40 to bypass the ball valve 56 when it is seated against the retainer washer 58.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine nozzle comprising:
an outer band;
an inner band;

a vane integrally joined between said outer and inner bands and being hollow for receiving cooling air, said inner band having a purge hole extending therethrough for discharging a portion of said cooling air from said vane; and means disposed in said nozzle for preventing backflow through said purge hole into said vane when pressure inside said vane is less than pressure outside said vane adjacent to said purge hole.

2. A nozzle according to claim 1 wherein said vane includes a leading edge and a trailing edge, and said purge hole is disposed through said inner band adjacent to said leading edge, and said backflow preventing means comprises a checkvalve disposed in said purge hole for permitting forward flow of said cooling air to be discharged from said vane, and for preventing backflow through said purge hole into said vane.

3. A nozzle according to claim 2 in combination with:
a rotor blade stage spaced forwardly from said vane; and
an annular thermal shield extending axially between said rotor blade stage and said vane to define an annular forward chamber therebetween for receiving said cooling air from said vane purge hole.

4. A combination according to claim 3 wherein:
said purge hole comprises an inlet disposed in flow communication with said hollow vane, an enlarged intermediate channel disposed in flow communication with said inlet, and an outlet disposed in flow communication with said intermediate channel; and
said checkvalve comprises a ball disposed in said intermediate channel, said ball having a diameter smaller than said intermediate channel and larger than said inlet, and being movable in said intermediate channel against said inlet for blocking backflow therethrough; and further comprising
a retainer fixedly joined to said inner band around said purge hole outlet for retaining said ball inside said intermediate channel, and configured for allowing forward flow of said cooling air to be discharged from said purge hole outlet around said ball.

5. A combination according to claim 4 wherein said retainer comprises an annular washer fixedly joined along the perimeter thereof to said inner band and having a plurality of inwardly projecting and circumferentially spaced apart tabs defining slots therebetween, said tabs being sized to prevent removal of said ball from said purge hole, and said slots allowing forward flow of said cooling air therethrough when said ball is in abutting contact with said tabs.

6. A combination according to claim 5 wherein said purge hole further comprises a conical seat joining said intermediate channel to said inlet for sealingly receiving said ball to prevent backflow from said purge hole outlet into said purge hole inlet.

7. A combination according to claim 6 further comprising:
a compressor;
a bleed line disposed in flow communication between said compressor and said vane for channeling bleed air to said vane for flow therethrough; and
a modulating valve disposed in said bleed line for modulating bleed airflow to said vane.

8. A combination according to claim 7 wherein said modulating valve is positionable to reduce bleed airflow to said vane and to decrease pressure of said cooling air inside said vane adjacent to said purge hole inlet to a value less than the pressure in said forward chamber, and thereby urging said ball against said seat to prevent backflow through said purge hole into said vane.

9. A method of operating the combination of claim 7 comprising positioning said modulating valve to reduce bleed airflow to said vane and to decrease pressure of said cooling air inside said vane adjacent to said purge hole inlet to a value less than the pressure in said forward chamber, and thereby urging said ball against said seat to prevent backflow through said purge hole into said vane.

* * * * *